United States Patent [19]
Akizuki et al.

[11] Patent Number: 4,837,193
[45] Date of Patent: Jun. 6, 1989

[54] HYDROTREATING CATALYST AND PROCESS OF MANUFACTURE

[75] Inventors: Ikuo Akizuki, Shizuoka; Hiroshi Kaya, Saitama; Shohei Okano, Saitama; Nobuo Otake, Saitama; Keiji Kumagai, Saitama; Yoshihito Kaneko, Saitama, all of Japan

[73] Assignee: Toa Nenryo Kogyo Kabushiki Kaisha, Tokyo, Japan

[21] Appl. No.: 84,467

[22] Filed: Aug. 10, 1987

Related U.S. Application Data

[63] Continuation of Ser. No. 726,112, Apr. 23, 1985, abandoned.

[51] Int. Cl.$^4$ ............... B01J 21/12; B01J 23/24; B01J 23/85; B01J 23/88
[52] U.S. Cl. ................... 502/242; 502/258; 502/259; 502/260; 502/263; 502/313; 502/314; 502/315; 502/332; 502/335
[58] Field of Search ............. 302/64, 66, 204, 207, 302/211, 219, 221, 222, 242, 251, 252, 254, 257, 258, 260, 263, 313, 314, 315, 332, 335

[56] References Cited

U.S. PATENT DOCUMENTS

| | | | |
|---|---|---|---|
| 3,114,701 | 12/1963 | Jacobson et al. | 208/254 H |
| 3,891,541 | 6/1975 | Oleck et al. | 208/251 H |
| 3,900,427 | 8/1975 | Riley et al. | 502/255 |
| 3,909,453 | 9/1975 | O'Hara | 502/255 |
| 3,925,197 | 12/1975 | van Klinken et al. | 208/216 R |
| 3,998,721 | 12/1976 | O'Hara | 502/254 |
| 4,016,106 | 4/1977 | Sawyer et al. | 502/332 |
| 4,046,714 | 9/1977 | O'Hara | 502/255 |
| 4,051,021 | 9/1977 | Hamner | 502/221 |
| 4,134,856 | 1/1979 | Itoh et al. | 502/258 |
| 4,179,411 | 12/1979 | Broersma et al. | 502/322 |

Primary Examiner—Anthony McFarlane
Attorney, Agent, or Firm—Henry E. Naylor

[57] ABSTRACT

Hydrotreating catalyst comprising silica/alumina or silica/alumina-containing carrier comprising 2 to 35 wt. % silica and Group VIII and/or Group VIB metals as hydrogenation active components is prepared by first step impregnation with at least one Group VIII metal and a second step impregnation with at least one Group VIB metal. Preferably the impregnation is via ion exchange using a complex salt, preferably an ammine or amine salt, of the metal. The carrier is characterized by a maximum of pores in 30 to 100 Å range and a minimum of pores in 0 to 30 Å and in 300 Å+.

7 Claims, 3 Drawing Sheets

FIG. 5

Rate of reduction vs Temperature (°C)

CATALYST E (CALCINED AT 600°C)

FIG. 6

Rate of reduction vs Temperature (°C)

CATALYST F (CALCINED AT 500°C)

HYDROTREATING CATALYST AND PROCESS OF MANUFACTURE

This application is a Rule 60 continuation of U.S. Ser. No. 726,112 filed Apr. 23, 1985, abandoned.

BACKGROUND OF THE INVENTION

This invention relates to a process for producing a catalyst useful in the hydrotreatment of hydrocarbon oils and to a catalyst produced by such a process as well as to the use of such a catalyst in the hydrotreatment of hydrocarbon oils. More particularly, this invention relates to a process for producing a hydrotreating catalyst comprising an alumina or an alumina-containing carrier which also contains a specified silica content and preferredly a specified pore size distribution, this carrier supporting hydrogenation-active components in a well-dispersed state.

In the description of this invention, the terms "hydrotreating" or "hydrotreatment" refer to various processes for treating a hydrocarbon oil by contact with hydrogen, which include hydrofining under reaction conditions of relatively low severity, hydrofining under reaction conditions of relatively high severity accompanied with an appreciable cracking reaction, hydroisomerization, hydrodealkylation, and other reactions of hydrocarbon oils in the presence of hydrogen. Hydrodesulfurization, hydrodenitrogenation, and hydrocracking of distillates and residual oils from atmospheric and vacuum distillation processes are examples of such processes as are the hydrofining of a kerosene fraction, a gas oil fraction, wax, or lubricating oil fractions.

Since the catalyst produced by this invention is suitably used in performing hydrodesulfurization of atmospheric middle distillates such as kerosene fraction and gas oil fraction, vacuum heavy distillates, residual oils containing asphalt, or mixtures thereof, the explicit description in this specification of the use of the catalyst will be made chiefly in connection to hydrodesulfurization.

Desulfurization processes comprising hydrofining a sulfur-containing hydrocarbon oil in the presence of a catalyst containing hydrogenation-active components have long been known, and nowadays the establishment and improvement of a hydrodesulfurization process whereby heavy hydrocarbon oils containing asphalt and metal-containing compounds can be desulfurized industrially is eagerly desired as a nonpolluting process. Moreover, the residual oils contain nitrogen compounds in addition to the sulfur compounds and as a result nitrogen oxides are formed upon combustion of such oils. The oxides of both sulfur and nitrogen are undesirable atmospheric pollutants.

The sulfur and nitrogen compounds contained in hydrocarbon oils can be removed in the forms of hydrogen sulfide and ammonia, respectively, by a hydrogenation reaction in the presence of a catalyst.

However, heavy hydrocarbon oils, especially residual oils, contain catalyst poisoning substances, for example, organic compounds of metals such as vanadium or iron, which remarkably lower the activity of a catalyst and further prevent its regeneration. Further, residual oils contain high-molecular compounds of polynuclear aromatics such as asphaltene and asphalt, and these compounds cover the active sites of the catalyst, and cause the formation of carbonaceous deposits which block the pores of the catalyst so as to lower its activity. Thus, the hydrofining of a heavy hydrocarbon oil must cope with extremely difficult technical problems.

Heretofore, a variety of investigations have been made about catalysts for use in the hydrodesulfurization of residual oils. For example, a process is known in which a catalyst having a pore size distribution in which the volume of pores having a diameter of at least 80 Angstroms is limited to below 10 percent of the total pore volume is used to prevent intrusion of the asphalt and metal-containing compounds contained in the feed oil into the pores. Similarly, a process is known in which a catalyst in which pores having a diameter of below 120 Angstroms are distributed relatively uniformly at intervals of 10 Angstroms. Further, there is also disclosed a catalyst for hydrodesulfurizing crude petroleum or topped crude petroleum in which the volume of pores having a diameter in the range of about 50 to 100 Angstroms accounts for at least 50 percent of the total pore volume and the volume of pores having a diameter in the range of 0 to 50 Angstroms accounts for at most 25 percent of the total pore volume.

Additionally, in the hydrodesulfurization in the petroleum refining, there has heretofore been widely used a hydrotreating catalyst produced by allowing an alumina carrier to support at least one metal selected from the group consisting of Group VIII metals of the Periodic Table of Elements and/or Group VIB metals of the Periodic Table of Elements, for example, a cobalt/molybdenum catalyst or a nickel/molybdenum catalyst. It is the most important factor in the production of such a hydrotreating catalyst to allow a carrier to support a large amount (about 20 percent or more by weight in terms of an oxide) of molybdenum/cobalt or molybdenum/nickel particles of a uniform composition in a highly dispersed state.

Proposed processes for producing a hydrotreating catalyst include (1) a coprecipitation process, (2) a kneading process, and (3) an impregnation process, all of which have been generally put into practice. The coprecipitation process, however, has a drawback that when a plurality of active metal components are used as in the case of the above-mentioned hydrotreating catalyst, it is difficult to disperse these active metal components uniformly and to produce a catalyst with good reproducibility. The kneading process also has a drawback that although it is necessary to ensure sufficient access of a plurality of active metal components to a carrier as well as their uniform and perfect mixing in producing a hydrotreating catalyst having a plurality of active metal components as above, attainment of such a state is extremely difficult in this process. As compared with the above two processes, the impregnation process may be thought suitable for the production of a hydrotreating catalyst having a plurality of active metal components as described above, for example, an alumina-supported cobalt/molybdenum or nickel/molybdenum catalyst.

In the production of a hydrotreating catalyst by the impregnation process, a process (two-step impregnation process) has been proposed which comprises using alumina generally as a carrier, allowing the carrier to support first molybdenum (first step), and then allowing the carrier to support cobalt or nickel in the form of fine particles of molybdenum/cobalt or molybdenum/nickel which are formed by the interaction between said active metal and molybdenum (second step). However, it is difficult to allow the carrier to support molybdenum in an amount of as large as about 15 percent by weight in a highly dispersed state in the first step, and the dispersibility in the catalyst obtained finally is virtually determined by the state of dispersion of molybdenum in said first step, which inevitably leads to decrease in activity.

The above mentioned problem of the impregnation process may be solved by using a process which comprises allowing an alumina carrier to support cobalt or nickel in the first step, and then allowing the carrier to support molybdenum, but no desired performances can be obtained in this case because when active metal components such as cobalt or nickel are supported on the alumina carrier, they do not show sufficient interaction with the alumina carrier and lose their activity by forming agglomerates of inactive $Co_3O_4$ or cobalt aluminate.

Further, a process comprising allowing an alumina carrier to support a plurality of active metals simultaneously by impregnation is not preferred because it is difficult to distribute all the components uniformly throughout the carrier.

As described above, it is extremely difficult in producing a catalyst containing large amounts of supported active metal components and carrying a plurality of active metal components, such as a hydrotreating catalyst, to allow the carrier to support all the components in a uniform and highly dispersed state by the conventional methods.

SUMMARY OF THE INVENTION

The inventors of this invention have discovered that cobalt and/or nickel as well as other Group VIII metals which are active metal components of a hydrotreating catalyst can be supported on the particular active points of a silica/alumina carrier or a silica-alumina-containing carrier, and that cobalt and/or nickel and/or other Group VIII metals may be supported stably in good dispersibility in a first step by replacing a conventional alumina carrier with a silica/alumina carrier or a silica/alumina-containing carrier. This is probably because cobalt and/or nickel and/or other Group VIII metals are supported on the acid sites of silica/alumina by a chemical interaction, and we have found that when a silica/alumina carrier or a silica/alumina-containing carrier is allowed to support cobalt and/or nickel and/or other Group VIII metals by ion exchange, the dispersibility of the metal can be markedly improved.

Furthermore, it has been found that the silica/alumina carrier which is allowed to support cobalt and/or nickel and/or other Group VIII metals in the first step as above may further be allowed to support molybdenum and/or other Group VIB metals in the second step, and that at this time molybdenum, as an example, is supported around cobalt and/or nickel, for example, by an interaction between molybdenum and cobalt and/or nickel, so that fine particles of molybdenum/cobalt or molybdenum/nickel may be supported in a uniform and highly dispersed state.

As described above, the inventors of this invention have found that, when silica/alumina or a silica/alumina-containing substance is used as a carrier, cobalt and/or nickel and/or other Group VIII metals act as a promoter and, at the same time, function as an anchor for molybdenum, and/or other Group VIB metals, so that it is effective in improving the dispersibility and stability of molybdenum and/or other Group VIB metals as active metal components.

Accordingly, one embodiment of this invention resides in a process for producing a hydrotreating catalyst characterized by using silica/alumina or a silica/alumina-containing substance as a carrier, allowing the carrier to support first at least one metal selected from the group consisting of Group VIII metals of the Periodic Table of Elements, and then allowing the carrier to support at least one metal selected from the group consisting of Group VIB metals of the Periodic Table of Elements. Particularly, this invention demonstrates that good catalytic activity can be obtained even by the use of lesser amounts of a Group VIII metal on a support.

In the process for producing a hydrotreating catalyst according to this invention, a silica/alumina or silica/alumina-containing carrier having acid sites is used instead of an alumina carrier. When silica/alumina or a silica/alumina-containing substance is used as a carrier and is allowed to support at least one Group VIII metal of the Periodic Table of Elements in the first step, the metal may be supported in a stable, well-dispersed state because said active metal component is bound to the acid sites of the silica/alumina. It is thus possible to allow the carrier to support at least one Group VIB metal of the Periodic Table of Elements, which is the principal active metal, outside a Group VIII metal, that is, on the layer of the Group VIII metal, by supporting the Group VIII metal in a well-dispersed state on the acid sites of a carrier in the first step, and therefore the catalyst of this invention is extremely suitable as a hydrotreating catalyst.

On the other hand, in the hydrotreating, especially hydrodesulfurization and hydrodenitrogenation, it is important that the catalyst has desired solid acidity, and it is known that the acidity may be controlled by the silica content of a carrier. Also in this invention, an excessive silica content of a silica/alumina or silica/alumina-containing carrier causes undesirable reactions such as increased consumption of hydrogen or coke formation due to excessive cracking reactions in the hydrodesulfurization or hydrodenitrogenation.

Accordingly in this invention, the silica content of a silica/alumina or silica/alumina-containing carrier is generally within the range of 2 to 35 percent by weight, preferably 5 to 30 percent by weight, particularly preferably 7 to 12 percent by weight.

The inventors of this invention have further discovered that the size distribution of pores in the region of both micropores and macropores of a catalyst greatly influences desulfurization and denitrogenation. Namely, a further feature of this invention has been the finding that a catalyst which preferably has the following properties with respect to the pore size distribution can exhibit an extremely marked desulfurization effect:

(1) the volume of pores having a diameter in the range of 30 to 100 Angstroms is at least 70 percent, preferably more than 80 percent, and most preferably more than 90 percent of the volume of pores having a diameter in the range of 0 to 150 Angstroms;

(2) the volume of pores having a diameter in the range of 100 to 300 Angstroms is less than about 30 percent, and preferably less than about 20 percent of the volume of pores having a diameter in the range of 0 to 300 Angstroms (the pore volumes in (1) and (2) being determined according to the nitrogen adsorption method);

(3) the volume of pores having a diameter in the range of 150 to 150,000 Angstroms as measured by the mercury porosimetry is about 0.005 to 0.25 ml/g, preferably 0.01 to 0.20 ml/g, and most preferably 0.02 to 0.10 ml/g;

(4) the volume of pores having a diameter in the range of 300 to 15,000 Angstroms as measured by the mercury porosimetry is less than 0.05 ml/g, preferably less than 0.03 ml/g, and most preferably less than 0.02 ml/g;

(5) the volume of pores having a diameter in the range of 150 to 2,000 Angstroms as measured by the mercury porosimetry is less than about 0.01 ml/g;

(6) the volume of pores having a diameter in the range of 0 to 600 Angstroms as measured by the nitrogen adsorption method is in the range of about 0.30 to 0.70 ml/g, preferably 0.40 to 0.65 ml/g, and most preferably 0.45 to 0.60 ml/g; and (7) the specific surface area is in the range from about 200 to 400 m$^2$/g, preferably 230 to 350 m$^2$/g, and most preferably 250 to 330 m$^2$/g.

Further, the catalyst has a total pore volume of about 0.4 to 0.9 ml/g, a bulk density of about 0.5 to 1.0 g/ml, and a side crushing strength of about 0.8 to 3.5 kg/mm.

According to another embodiment of this invention, the following properties are also fulfilled:

(8) the volume of pores having a diameter in the range of 150 to 300 Angstroms corresponds to at most about 30 percent, preferably at most 20 percent, and most preferably at most 10 percent of those having a diameter in the range of 0 to 300 Angstroms; and (9) the volume of pores having a diameter in the range of 0 to 300 Angstroms as measured by the nitrogen adsorption method is in the range of about 0.30 to 0.70 ml/g, preferably 0.04 to 0.65, ml/g and most preferably 0.45 to 0.60 ml/g.

Accordingly, one embodiment of this invention provides for a process for producing a hydrotreating catalyst by the sequential impregnation method described above, this catalyst comprising a silica/alumina or silica/alumina-containing carrier containing about 2 to 35 percent by weight of silica to support a hydrogenation-active component comprising at least one metal selected from the group consisting of Group VIII metals of the Periodic Table of Elements and Group VIB metals of the Periodic Table of Elements and mixtures thereof and in which the pore structure of the catalyst preferably has the pore size distribution as hereinabove described.

In brief, in order to prevent the asphalt and resinous matter contained in a heavy hydrocarbon oil, especially in a residual oil, from penetrating into the pores of a hydrofining catalyst and causing deactivation of the catalyst in performing contact with hydrogen in the presence of said catalyst it is necessary to reduce the pore volume of the macropores.

Further, it will be understood that in order to inhibit the conversion of hydrocarbon oil into light hydrocarbons by the carbon-carbon cleavage in saturated hydrocarbons, and to prevent pores from being blocked by asphalt and resinous matter, it is desirable to reduce the volume of pores having a diameter less than 30 Angstroms.

It is already well known that a solid acid such as alumina/silica is a catalyst component suitable for the desulfurization and denitrogenation reactions of hydrocarbon oils and, as mentioned earlier, it is important in hydrofining that the desired solid activity is retained, and the control of this acidity for this purpose may be made by adjusting the silica content. The inventors of this invention have recognized that the performance and selectivity of a catalyst in the hydrogenation reaction of hydrocarbons may be controlled by specifying the pore structure of the catalyst and at the same time adjusting the cracking activity by controlling the acidity by the silica content of the carrier. The selectivity of this kind plays an extremely important role because it is effective in saving hydrogen consumption and preventing the deactivation of a catalyst due to the deposition of carbon produced in the cracking reactions in carrying out the desulfurization and denitrogenation of hydrocarbon oils.

Therefore, as mentioned above, in order to prevent an increase in hydrogen consumption, coke formation, etc., caused by excessive cracking reaction, in the hydrodesulfurization reaction or the hydrodenitrogenation reaction, the silica content of an alumina-containing carrier should be within the range of about 2 to 35, preferably about 5 to 30 and most preferably about 7 to 12 percent by weight.

In the above-mentioned hydrotreating catalyst, the pore diameters fall mostly in the range of 30 to 100 Angstroms as measured by the nitrogen adsorption method, but as a whole, these pores are distributed over a relatively wide range.

The reason why the pore size distribution of the catalyst disclosed in this invention exerts a marked effect on the activity and activity maintenance in the hydrodesulfurization of hydrocarbon oil will be as follows, though it is not fully understood. Because the pore size distribution is relatively wide, asphalt, resinous matter and metal-containing compounds in a feedstock are attached to the surface of the catalyst to block the pores and isolate the active sites of the catalyst completely when these pores are extremely small, while when the pore size is large in a specified range, the metal-containing components, i.e., asphalt or resin, are attached suitably to the surface of a catalyst but do not block the pores completely, which permits the access of hydrocarbon molecules and sulfur molecules reaching the catalyst to the active sites to thereby exert a high performance.

The carrier which is used in the practice of this invention is an alumina or alumina-containing substance comprising about 2 to 35 percent by weight of silica. The alumina-containing substance is a composition obtained by mixing alumina with a different carrier material, and it is possible to add at least one member selected from the group consisting of, for example, magnesia, calcium, oxide, zirconia, titania, boria, hafnia, and crystalline zeolite to alumina. As mentioned above, said silica is suitable for controlling the solid acidity of the catalyst, so that it may be used in an amount in the range of about 2 to 35 percent by weight, preferably about 5 to 30 percent by weight, based on the carrier. A particularly preferable silica content may be in the range of about 7 to 12 percent by weight.

This silica gives strong-acid sites to the catalyst and enhances the cracking activity of the catalyst, whereas magnesia, for example, has an effect of decreasing the strong-acid sites contained in alumina/silica or the like, and at the same time, increasing the weak-acid sites to improve the selectivity of the catalyst. The amounts of addition of the above-mentioned refractory inorganic oxides such as magnesia, calcium oxide, zirconia, titania, boria, hafnia and a crystalline zeolite are suitably about 1 to 10 percent by weight, based on the alumina/silica.

Suitable alumina includes γ-alumina, χ-alumina, η-alumina, and a mixture thereof, though any alumina that can provide the pore size distribution and the properties disclosed in this invention can be used desirably.

Processes which can be adopted in producing the alumina-silica include one comprising separately preparing alumina and silica gels and blending them, one comprising immersing silica gel in a solution of an aluminum compound and precipitating alumina gel on the silica gel by adding a suitable amount of a basic substance, and one comprising coprecipitating a water soluble aluminum compound and a water-soluble silicon compound by adding a basic substance to a uniform solution of both compounds.

In order to obtain a catalyst having the preferred pore size distribution and properties described above for the hydrotreatment catalyst used in this invention, conditions including a temperature of 60° to 90° C. and a time of 0.5 to 3 hours are necessary in the preparation and aging of aluminum and silica hydrates.

Specific materials which can be used in obtaining the catalyst of this invention include, for example, water-soluble acidic aluminum compounds and water-soluble alkaline aluminum compounds, and specifically, sulfates, chlorides, and nitrates of aluminum, alkali metal aluminates, aluminum alkoxides, and other inorganic or organic salts. Suitable water-soluble silicon compounds include silicon-containing compounds such as alkali metal silicates (preferably one having a $Na_2O$ to $SiO_2$ ratio of 1:2 1:4), tetraalkoxysilanes, and orthosilicate esters. These aluminum and silicon compounds may be used in the form of aqueous solutions, and the concentrations of the aqueous solutions are not particularly limited but are suitably selected without any objection and the concentration of an aqueous aluminum compound solution may be selected in the range of about 0.1 to 4.0 molar.

An embodiment of the process for producing an alumina/silica carrier suitable for use in the hydrotreatment catalyst of this invention will follow.

An aqueous solution of an acidic aluminum solution and an alkali hydroxide (the ratio of alkali hydroxide to acidic aluminum being in the range of about 0.3 to 2 moles/per liter) are added to hot water at about 50° to 98° C. and the resulting solution is adjusted to have a pH in the range of about 6.0 to 11.0, preferably about 8.0 to 10.5, and allowed to stand for at least one hour at a temperature of about 50° to 98° C. This solution is further kept at a temperature of about 50° to 98° C. for at least two hours, during which an aqueous solution of an alkali silicate and, if necessary, a mineral acid solution are added to adjust the pH to a value in the range of about 6.0 to 11.0, preferably about 8.0 to 10.5. When a hydroxycarboxylic acid or its salt, for example, tartaric acid, citric acid, or other hydroxypolycarboxylic acids or their alkali metal salts are added, a still better catalyst carrier can be obtained. Further, an aminodicarboxylic or its salt, for example, glutamic acid, aspartic acid, or other amino group-containing polycarboxylic acid or their alkali metal salts can be used. These compounds can be added in an amount in the range of 0.0002 to 0.1 mole per mole of an aluminum compound. After completion of this treatment, the precipitate is filtered, washed with an ammonium acetate or an ammonium carbonate solution and water to remove ionic impurities, and dried and calcined into a finished carrier by the usual methods.

This drying is performed by heating to a drying temperature of about 200° C. in the presence or absence of oxygen, and the calcination is performed by heating to a temperature in the range of about 200° to 800° C. in the presence of oxygen.

The hydrogenation-active metal components supported on the carrier are at least one metal selected from the group consisting of Groups VIB and VIII metals of the Periodic Table of Elements. Namely, at least one metal is selected from the group consisting of Group VIB metals including chromium, molybdenum, and tungsten, and Group VIII metals including iron, cobalt, nickel, palladium, platinum, osmium, iridium, ruthenium and rhodium for use. Preferably molybdenum and tungsten, as Group VIB metals, may be used alone or together. Similarly, preferred Group VIII metals include cobalt and nickel which may be used alone or together. Particularly, in the hydrodesulfurization of hydrocarbon oil, a combination of a Group VIB metal with a Group VIII metal, for example, molybdenum/cobalt, molybdenum/nickel, tungsten/nickel, molybdenum/cobalt/nickel, or tungsten/cobalt/nickel may be used suitably. It is also possible to add a Group VII metal in the Periodic Table of Elements, for example, manganese, or a Group IV metal, for example, tin or germanium to these active metal components.

These hydrogenation-active metal components are suitably supported in the form of oxides and/or sulfides.

The process for supporting is an impregnation process comprising immersing a carrier in a solution of a soluble salt of said metal to thereby infiltrate the metal component into the carrier. As has been mentioned above, in the present invention the procedure for supporting the hydrogenation-active metal components is via a novel two-step impregnation procedure wherein in a first step a carrier is immersed in aqueous solutions of soluble salts of at least one Group VIII metal and then in a subsequent second impregnation step the Group VIII metal impregnated carrier from said first step is immersed in aqueous solutions of soluble salts of at least one Group VIB metal to thereby introduce the metal components into the carrier. The impregnation operation comprises immersing a carrier in an impregnation solution at ordinary temperature or higher and holding the carrier under such a condition as to permit full impregnation of the carrier with the desired components. The amount and temperature of the impregnation solution may be suitably selected so that the metals may be supported in desired amounts. The amount of the carrier immersed in an impregnation solution is determined by the amount of metals to be supported.

The hydrogenation-active metal component which is supported by a carrier in the first step is at least one metal selected from the group consisting of Group VIII metals of the Periodic Table of Elements. Namely, at least one member is selected from the Group VIII metals including iron, cobalt, nickel, palladium, platinum, osmium, iridium, ruthenium, and rhodium. Preferably, cobalt or nickel may be used alone or together.

The hydrogenation-active metal component which is supported by a carrier in the second step is at least one metal selected from the group consisting of Group VIB metals of the Periodic Table of Elements. Namely, at least one member is selected from the Group VIB metals including chromium, molybdenum and tungsten. Preferably, molybdenum and tungsten may be used alone or together. As previously mentioned, a third metal, if desired, may be added in the pretreatment of the carrier prior to the first step or in the aftertreatment after the second step.

The inventors of this invention have found that a most suitable means for carrying out the first step in the process for producing a catalyst according to this invention is an ion exchange process wherein the exchange between the protons on the surface of a silica/alumina or silica/alumina-containing carrier and said metal ions is performed through ammonium ions. It has been found that when this invention is performed according to the ion exchange process, the dispersibility in a catalyst is improved markedly as compared with that in a catalyst prepared by a usual impregnation process, and the chemical uniformity can also be improved.

Further it has been found that in the case of allowing a silica/alumina carrier or a silica/alumina-containing carrier to support a Group VIII metal by the ion-exchange method, the catalyst prepared by such method is subject to less influence of the calcination temperature during a calcination step due to the increasing dispersibility and chemical uniformity in said supporting step as mentioned above.

The process for producing the catalyst according to the ion-exchange method is performed by preparing a solution of basic complex salt such as a solution of a ammine complex salt or an amine complex salt of the active metal and immersing a silica/alumina carrier or a silica/alumina-containing carrier in said solution to thereby allow the carrier to support said metal. The amount and concentration of the solution of the basic complex salt may be suitably controlled so that the desired amount of the metal may be supported.

The hydrogenation-active metal components of Groups VIII and VIB are supported suitably in the form of an oxide and/or a sulfide. The amounts of the active metal components supported are 0.5 to 20 percent by weight, preferably 1 to 8 percent by weight, particularly preferably 2 to 5 percent by weight in terms of an oxide, based on the catalyst, for a Group VIII metal, and 5 to 30 percent by weight, preferably 8 to 25 percent by weight, and particularly preferably 12 to 20 percent by weight, in terms of an oxide, based on the catalyst for a Group VIB metal. When the amount of a Group VIII metal supported is below 0.5 percent by weight, no satisfactory catalyst can be obtained, while when it exceeds 20 percent by weight, the amount of a free metal component not bound with a carrier increases. When the amount of a free component of a Group VIII metal is increased, an inactive double oxide is formed in the subsequent step of allowing a carrier to support a Group VIB metal, which lowers the dispersibility of the Group VIB metal to thereby lower the catalytic activity. On the other hand, when the amount of a Group VIB metal is below 5 percent by weight, no sufficient activity can be obtained, while when it exceeds 30 percent by weight, the dispersibility is lowered and besides no effect of a Group VIII metal as a promotor is obtained.

The form of the catalyst may be cylinders, granules, tablets, or any other shapes, and these shapes can be obtained by molding processes such as extrusion and granulation. The diameter of the extrudate is preferably in the range of 0.5 to 3.0 mm.

The carrier impregnated with the hydrogenation-active metal components is separated from the impregnation solution, dried, and calcined. The drying may be carried out by heating up to a temperature of about 200° C. in the presence or absence of oxygen, and the calcination is performed by heating to a temperature in the range of about 200° C. to 800° C. in the presence of oxygen.

As mentioned above, the catalyst produced in this way comprises a silica/alumina or silica/alumina-containing carrier comprising about 2 to 35 percent by weight of silica and supporting a hydrogenation-active metal component. Preferably it is characterized in that:

(1) the volume of pores having a diameter in the range of 30 to 100 Angstroms is at least 70 percent, preferably more than 80 percent and most preferably more than 90 percent of the volume of pores having a diameter in the range of 0 to 150 Angstroms, (2) the volume of pores having a diameter in the range of 100 to 300 Angstroms is less than about 30 percent and preferably less than about 20 percent of the volume of pores having a diameter in the range of 0 to 300 Angstroms (the pore volumes in (1) and (2) being determined according to the nitrogen adsorption method), (3) the volume of pores having a diameter in the range of 150 to 150,000 Angstroms as measured by the mercury porosimetry is about 0.005 to 0.25 ml/g, preferably 0.01 to 0.20 ml/g and most preferably 0.02 to 0.10 ml/g, (4) the volume of pores having a diameter in the range of 300 to 15,000 Angstroms as measured by the mercury porosimetry is less than 0.05 ml/g, preferably less than 0.03 ml/g and most preferably less than 0.02 ml/g, (5) the volume of pores having a diameter in the range of 150 to 2,000 Angstroms as measured by the mercury porosimetry is less than about 0.01 ml/g, (6) the volume of pores having a diameter in the range of 0 to 600 Angstroms as measured by the nitrogen adsorption method is in the range of about 0.30 to 0.70 ml/g, preferably 0.40 to 0.65 ml/g and most preferably 0.45 to 0.60 ml/g and (7) the specific surface area is in the range from about 200 to 400 $m^2/g$, preferably 230 to 350 $m^2/g$ and most preferably 250 to 330 $m^2/g$. Further it has a total pore volume of 0.5 to 1.0 ml/g, a bulk density of about 0.5 to 1.0 g/ml, a side crushing strength of about 0.8 to 3.5 kg/mm; and realizes an excellent catalyst for hydrotreating hydrocarbon oil.

The nitrogen adsorption method and the mercury porosimetry which are used as methods for measuring the pore volume of a catalyst are performed in accordance with the methods described in P. H. Emmett, et al; Catalysis 1, 123 (1954) (Reinhold Publishing Co.) and Lectures on Catalyst Engineering (Shokukai Kogaku Koza) Vol. 4, Pages 69 to 78 (1964) (Chijinshokan). The mercury porosimetry is performed on the assumption that the angle of a catalyst with mercury is 140°, the surface tension is 480 dynes/cm, and the pores are all cylindrical.

For the nitrogen adsorption method, a number of methods are proposed for correcting multilayer adsorption. Among these, BJH method [E. P. Barrett, L. G. Joyner and P. P. Halanda; J. Amer. Chem. Soc., 73, 373 (1951)], and CI method [R. W. Cranston and F. A. Inkley; "Advances in Catalysis", IX, 143 (1957) (New York Academic Press)] are usually used. The data on pore volumes in this invention are those obtained by using the adsorption sides of adsorption isothermic curves and calculating the volume according to the DH method [D. Dollimore and G. R. Heal; J. Applied Chem., 14, 109 (1964)]

Description will be made of a process for hydrodesulfurizing hydrocarbon oils by using a catalyst produced according to this invention.

Vacuum gas oils, heavy cracked gas oils and atmospheric gas oils are examples of oils which can be used as the hydrocarbon feedstocks for the hydrotreating of this invention. A vacuum gas oil is heavy distillate containing considerable amounts of sulfur, nitrogen compounds and metal compounds obtained by subjecting an atmospheric residual oil to vacuum distillation and containing a fraction having a boiling point in the range of about 250° to about 560° C. For example, a vacuum gas oil obtained from Middle East crude oil contains about 2 to 4 percent by weight of sulfur, about 0.05 to 0.2 percent by weight of nitrogen, and about 0.4 to 0.5 percent by weight of Conradson carbon residue. A heavy cracked oil is an oil having a boiling point higher than about 200° C., obtained by thermal cracking of a residual oil. For example, distillates obtained by the coking or visbreaking of residual oils can be used. Further, as hydrocarbon oil feedstocks, heavy hydrocarbon oils including residual oils obtained by atmospheric or vacuum distillation of crude oils can be employed. For example, a residual oil containing about 30 to 100 percent by weight of a hydrocarbon component having an atmospheric boiling point higher than about 480° C. usually contains about 1 to 10 percent by weight of sulfur, about 0.1 to 1 percent by weight of nitrogen, about 10 to 1,000 ppm of metals and about 1 percent by weight of Conradson carbon residue. The above-mentioned atmospheric gas oils, atmospheric residual oils, vacuum gas oils, vacuum residual oils, and heavy cracked oils, and mixtures thereof may be used as feedstocks to the hydrotreating of this invention. Reaction conditions may be selected appropriately depending upon the kind of feedstocks, desulfurization or denitrogenation percentages, and the like. Specifically, the reaction is generally conducted under the following conditions: a reaction temperature of about 350° to 450° C., a reaction pressure of about 30 to 200 kg/cm$^2$, a hydrogen-containing gas flow rate of about 50 to 1,500 l/l. and a liquid hourly space velocity of about 0.2 to 2.0 V/H/V are adpoted. The hydrogen concentration of hydrogen-containing gas may be in the range of about 60 to 100 percent.

The catalyst which is produced according to this invention is characterized that deactivation is very low and a high degree of desulfurization can be attained even under mild reaction conditions, especially, at a low reaction pressure.

It is preferred that the catalyst is presulfided prior to its use. This presulfiding may be performed in situ, namely in a reactor. Namely, a calcined catalyst is brought into contact with a sulfur-containing distillate in the presence of about 50 to 1,500 l/l of a hydrogen-containing gas under conditions including a temperature of about 150° to 400° C., a pressure (total pressure) of about 5 to 100 kg/cm$^2$, and a liquid hourly space velocity of about 0.3 to 2.0 V/H/V. After this sulfiding treatment, the sulfur-containing distillate is switched over to a feedstock, and the operation is restarted under operation conditions suitable for desulfurization of the feedstock. In addition to the above process, use may be made of a process for effecting sulfiding comprising either bringing the catalyst into direct contact with hydrogen sulfide or other sulfur compounds or by adding the sulfur compound to a suitable distillate and bringing the resulting distillate into contact with the catalyst.

Although the catalyst may be used in any of the systems including fixed bed, fluidized bed, and moving bed, a fixed bed reactor is preferred in performing hydrodesulfurization from the viewpoint of apparatus and operation. Further, it is also possible to obtain a high degree of desulfurization by performing hydrodesulfurization by using a plurality of reactors connected. Further, the catalyst of this invention may be packed for use in a guard drum for demetallization provided in front of the main reactor chiefly for desulfurization/denitrogenation reactions.

This invention will now be described with reference to examples.

EXAMPLES 1, 2 AND 3

13.9 g of cobalt nitrate was dissolved in 70 ml of distilled water. 80 ml of ammonia was added thereto to obtain a cobalt ammine complex salt solution. 50 g of a silica/alumina carrier (silica content of 10 percent by weight) was immersed in this solution for 16 hours to allow it to support 5 percent by weight (in terms of an oxide) of cobalt. A catalyst obtained by air-drying and calcination at 300° C. is referred to as catalyst A (Example 1), a catalyst obtained by calcination at 500° C. as catalyst B (Example 2), and a catalyst obtained by calcination at 600° C. as catalyst C (Example 3).

EXAMPLES 4 AND 5

A commercially available alumina carrier was allowed to support 5 percent by weight (in terms of cobalt oxide) of cobalt in the same procedure as in Example 1. A catalyst prepared at a calcination temperature of 300° C. is referred to as catalyst D (Example 4), and a catalyst prepared at a calcination temperature of 600° C. as catalyst E (Example 5).

To see the state of cobalt oxide on the carrier, the catalysts obtained in Examples 1, 2, 3, 4 and 5 were analyzed by the temperature-programmed reduction method. The procedure was in accordance with that by J. W. Jenkins et al (CHEMTECH Vol. 7, 316-320 (1977)). The results are shown in FIGS. 1 through 5.

The cobalt oxide supported on the alumina carrier is either in a state in which it is reducible at below 300° C. (this is thought to exist in the form of fine cobalt oxide particles not bound with the carrier) or in a state in which it is not reducible at 700° C. (this is thought to be a cobalt oxide which is bound strongly with alumina, such as cobalt aluminate). In catalyst D prepared at a calcination temperature of 300° C., the cobalt oxide mostly takes the form of the former, while in catalyst E prepared at a calcination temperature of 600° C., the cobalt oxide mostly takes the form of the latter. For catalysts prepared at intermediate temperatures, only the ratio of both was varied, and no cobalt oxides in other forms were found.

On the other hand, on the silica/alumina carrier, the amounts of cobalt oxides in the states observed on the alumina carrier are rather small and a cobalt oxide reducible at 500° to 700° C. (a cobalt oxide moderately bound with a carrier) accounts for a major portion. Thus the influence of the calcination temperature is smaller than that in the alumina carrier.

The above results indicate that there is a marked difference in respect of the state of a cobalt oxide which is one of the active metal components between the silica/alumina carrier and alumina which is widely used as a carrier for desulfurization cataysts, and therefore suggest that the use of the silica/alumina carrier makes a novel catalyst manufacturing process having this merit possible.

EXAMPLE 6

The same silica/alumina carrier as in Example 1 was allowed to support 5.0 percent by weight of cobalt in the form of a cobalt oxide in the same procedure as in Example 1 except that an aqueous cobalt nitrate solution was used instead of the solution of cobalt ammine complex salt. The catalyst prepared at a calcination temperature of 500° C. is referred to as catalyst F. The results of analysis by the temperature-programmed reduction method of catalyst F are shown in FIG. 6. As compared with catalyst B, this catalyst showed a somewhat complicated profile, which indicated that the state of the oxide supported was not uniform.

COMPARATIVE EXAMPLES 1, 2, 3 AND 4

Four kinds of cobalt/molybdenum catalysts were produced by using a silica/alumina containing 25 percent by weight of silica as a carrier.

Catalyst G (Comparative Example 1) 13.2 g of ammonium molybdate was dissolved in 50 ml of 3N-aqueous ammonia. 25 g of a silica/alumina carrier was immersed in this solution, then allowed to stand for two hours and, after discarding the liquid, dried in air. After calcination at 550° C., this carrier was allowed to support cobalt in the same procedure as in Example 6. After air-drying, the product was calcined at 550° C. to obtain catalyst G.

Catalyst H (Comparative Example 2) A carrier was allowed to support molybdenum by the same procedure as in the production of catalyst G, then calcined at 550° C., and further allowed to support cobalt by using a solution of cobalt ammine complex salt by the same procedure as in Example 1. After air-drying, the carrier was calcined at 550° C. to obtain catalyst H. Catalyst I (Comparative Example 3) 13.9 g of cobalt nitrate was dissolved in 70 ml of distilled water. To this solution, 80 ml of ammonia was added. 26.4 g of ammonium molybdate was further dissolved in this solution. 50 g of a silica-alumina carrier was immersed in this solution, allowed to stand for two hours and, after discarding the liquid and air-drying, calcined at 550° C. to obtain catalyst I.

Catalyst J (Comparative Example 4) 28.0 g of phosphomolybdic acid was dissolved in 150 ml of ethanol. 27.7 g of cobalt nitrate was dissolved in this solution. 50 g of a silica/alumina carrier was immersed in the resulting solution, allowed to stand for two hours and, after discarding the liquid, dried in air and calcined at 550° C. to obtain catalyst J.

EXAMPLES 7 AND 8

Catalyst K (Example 7) A carrier was allowed to support cobalt by the same procedure as in Example 1 by using a solution of cobalt amine complex salt. After air-drying, the carrier was calcined at 550° C. and then immersed in a 3N-aqueous ammonia solution of ammonium molybdate to allow it to support molybdenum. After air-drying, the carrier was calcined at 550° C. to obtain catalyst K.

Catalyst L (Example 8) A carrier was allowed to support cobalt in the same procedure as in Example 4 by using an aqueous solution of cobalt nitrate. After air-drying, the carrier was calcined at 550° C., and further allowed to support molybdenum in the same way as in Example 7 to obtain catalyst L.

The desulfurization activities of catalysts G, H, I, J, K, and L were examined by the desulfurization reaction of thiophene.

The feed had a composition of 5.5 percent by weight of thiophene, 2.3 percent by weight of pyridine, and 92.2 percent by weight of n-hexane. The reaction conditions were as follows:

| Reaction temperature (°C.) | 300 |
|---|---|
| Reaction pressure | Atmospheric, |
| Feed Rate (W/H/W) | 1.5 |
| $H_2$/Feed Molar Ratio | 6.0 |

TABLE 1

| Catalyst | G | H | I | J | K | L |
|---|---|---|---|---|---|---|
| $MoO_3$ wt. % | 15 | 15 | 15 | 15 | 15 | 15 |
| CoO wt. % | 5 | 5 | 5 | 5 | 5 | 5 |
| Conversion of Thiophene % | 10.5 | 10.4 | 12.1 | 10.5 | 19.5 | 17.0 |

The above results show that with an alumina carrier containing silica, catalysts K and L of this invention had markedly high activities as compared with catalysts G, H, I, and J which were prepared by other methods.

COMPARATIVE EXAMPLES 5 AND 6, AND EXAMPLES 9 THROUGH 15

Nickel/molybdenum catalysts (M through U) were prepared by using nine kinds of silica/alumina carriers having different silica contents. The supporting procedure used was the same as in Example 7 (catalyst K) except that a nickel amine complex salt was used.

The performance of these catalysts were evaluated by the desulfurization reaction of a vacuum distillate from Middle East crude oil. The reaction conditions were as follows:

| Reaction Temperature (°C.) | 320 |
|---|---|
| Reaction Pressure (kg/cm²) | 50 |
| Catalyst Loaded (ml) | 12 |
| Feed Rate (V/H/V) | 0.8 |
| $H_2$/Feed Ratio (SCF/B) | 2500 |

TABLE 2

| | Comp. 5 | Ex. 9 | Ex. 10 | Ex. 11 | Ex. 12 | Ex. 13 | Ex. 14 | Ex. 15 | Comp. 6 |
|---|---|---|---|---|---|---|---|---|---|
| Catalyst | M | N | O | P | Q | R | S | T | U |
| $SiO_2$ *(wt. %) | 0 | 2 | 5 | 10 | 16 | 24 | 30 | 35 | 40 |
| NiO (wt. %) | 4 | 4 | 4 | 4 | 4 | 4 | 4 | 4 | 4 |
| $MoO_3$ (wt. %) | 14 | 14 | 14 | 14 | 14 | 14 | 14 | 14 | 14 |
| Desulfurization Percentage (%) | 71 | 78 | 79 | 81 | 77 | 73 | 72 | 70 | 65 |
| Denitrogeneration Percentage (%) | 16 | 23 | 27 | 29 | 26 | 24 | 24 | 22 | 19 |

TABLE 2-continued

| Catalyst | Comp. 5 M | Ex. 9 N | Ex. 10 O | Ex. 11 P | Ex. 12 Q | Ex. 13 R | Ex. 14 S | Ex. 15 T | Comp. 6 U |
|---|---|---|---|---|---|---|---|---|---|
| Bulk Density | 0.65 | 0.86 | 0.65 | 0.70 | 0.70 | 0.65 | 0.59 | 0.62 | 0.57 |

*wt. % , based on carrier
**Properties of Feed Oil
Sulfur Content (wt. %) 2.20
Nitrogen Content (wppm) 262
Specific Gravity (15/4° C.) 0.927
Residual Carbon (CCR wt. %) 0.70

The results of Table 2 shows that the manufacturing process according to this invention shows a marked effect of improving the desulfurization and/or denitrogenation activities of a cobalt/molybdenum or nickel/molybdenum catalyst prepared from a silica/alumina carrier containing 2 to 35 percent by weight of silica.

EXAMPLE 16

9.7 g of cobalt nitrate and 1.4 g of nickel nitrate were dissolved in 70 ml of distilled water. Then, 50 g of a silica/alumina carrier containing 10 percent by weight of silica was immersed in this solution for 12 hours, and allowed to support cobalt and nickel in the form of oxides in an amount of 3.5 percent by weight and 0.5 percent by weight, respectively. This carrier supporting cobalt and nickel was dried in air, calcined at 550° C., and immersed in a 3N-aqueous ammonia molybdate solution to obtain a catalyst supporting 14 percent by weight of molybdenum in the form of molybdenum oxide (catalyst V). The results are shown in Table 3. This table shows that the Co-Ni-Mo catalyst according to this invention also showed excellent desulfurization and denitrogenation rates.

EXAMPLE 17

Catalyst W was prepared by using the same conditions and procedure as in Example 11, except that wolfram was used instead of molybdenum. Tungsten was supported by a carrier by using a solution of ammonium tungstate in distilled water. The results on catalyst W are shown in Table 3. This table shows that the Ni/W catalyst according to this invention also showed excellent desulfurization and denitrogenation activities.

EXAMPLE 18

4.8 l of distilled water was heated to about 70° C. To this were added a sodium hydroxide solution (233.6 g of deionized water) and an aqueous aluminum sulfate solution (644.5 g of aluminum sulfate and 987 g of deionized water). To the resulting solution was added an aqueous diammonium tartrate solution in an amount such that 2 mmoles of diammonium tartrate was present per 1 mole of alumina. The pH of this solution was adjusted to 8.8 to 9.2 with a sodium hydroxide solution or an aqueous nitric acid solution, and then ages at about 70° C. for about one hour. To this an aqueous sodium silicate solution (42.5 g of No. 3 water glass, 129.4 g of deionized water) was added and, if desired, an aqueous nitric acid solution was added to adjust the pH to about 9. The resulting solution was aged at a temperature of about 70° C. for three hours.

The produced slurry was filtered, and the cake was reslurried in a 1.5 percent ammonium carbonate solution, then filtered and washed with an ammonium carbonate solution until the sodium concentration of the filtrate was lowered to below 5 ppm. It was dried at 100° C. for 16 hours, and after adding deionized water and a small amount of acetic acid, mixed while it was being dried to a moldable water content, and then molded through an extruder into a cylinder of 1.5 mm $\phi$. The molded pellets were dried at 100° C. for 16 hours and further calcined at 600° C. for three hours to obtain a carrier.

Separately, the carrier was allowed to support nickel and molybdenum by using the same procedure as in Example 11 except that use was made of a nickel amine complex salt solution prepared by dissolving nickel nitrate in distilled water and adding thereto ammonia. Namely, 50 g of the above silica/alumina carrier (silica content of 10 percent by weight) was immersed in this nickel amine complex salt solution for 16 hours to allow the carrier to support 4 percent by weight of nickel in the form of a nickel oxide. This carrier supporting nickel was dried in air, calcined at 550° C., and allowed to support 14 percent by weight of molybdenum in the form of molybdenum oxide by immersing in a 3N-aqueous ammonium molybdate solution. After air-drying, it was calcined at 550° C. to obtain a catalyst. This is referred to as catalyst X. The physical properties of this catalyst are as follows:

Physical Properties:

| Specific Surface Area (m²/g) | 265 |
|---|---|
| Bulk Density (g/ml) | 0.72 |
| Side Crushing Strength (kg/mm) | 1.6 |
| Particle Diameter of Catalyst (max.) (mm) | 1.6 |
| Pore Volume (ml/g) (Pore Diameter [Angstrom]) | |
| 0-30 | 0.002 |
| 30-100 | 0.389 |
| 100-300 | 0.072 |
| 0-150 | 0.425 |
| 0-300 | 0.463 |
| 0-600 (N₂ gas adsorption method) | 0.525 |
| 150-150,000 (mercury porosimetry) | 0.021 |
| 150-2,000 (mercury porosimetry) | 0.008 |
| PV (30-100)/PV (0-150) × 100 (%) | 91.5 |
| PV (100-300)/PV (0-300) × 100 (%) | 15.3 |

Catalysts N through T in Examples 9 through 15 were prepared by using tentatively produced silica/alumina carriers and, for example, catalyst P (Example 11) having a silica content of 10 percent by weight had the following physical properties.

Physical Properties:

| Specific Surface Area (m²/g) | 219 |
|---|---|
| Bulk Density (g/ml) | 0.70 |
| Side Crushing Strength (kg/mm) | 1.5 |
| Particle Diameter of Catalyst (max.) (mm) | 1.5 |
| Pore Volume (ml/g) (Pore Diameter [Angstrom]) | |
| 0-30 | 0.058 |
| 3-100 | 0.189 |

-continued

| | |
|---|---|
| 100–300 | 0.118 |
| 0–150 | 0.284 |
| 0–300 | 0.365 |
| 0–600 | 0.517 |
| 150–150,000 | 0.026 |
| 150–2,000 | 0.013 |
| PV (30–100)/PV (0–150) × 100 (%) | 66.5 |
| PV (100–300)/PV (0–300) × 100 (%) | 32.3 |

Table 3 shows that catalyst X having a specified pore size distribution had more excellent desulfurization and denitrogenation rates than catalyst P having a different pore size distribution.

EXAMPLE 19

9.8 g of cobalt nitrate and 1.4 g of nickel nitrate were dissolved in 70 ml of distilled water, to which was further added 80 ml of ammonia to obtain a mixed cobalt-/nickel amine complex salt solution. 50 g of a silica/alumina carrier containing 10 percent by weight of silica was immersed in this solution for 16 hours to allow the carrier to support cobalt and nickel in the form of oxides in amounts of 3.5 percent by weight and 0.5 percent by weight, respectively. After air-drying and calcination, it was allowed to support molybdenum in the form of an oxide in an amount of 14 percent by weight in the same manner as in Example 18 to obtain catalyst Y.

TABLE 3

| Catalyst | Ex. 11 P | Ex. 16 V | Ex. 17 W | Ex. 18 X | Ex. 19 Y |
|---|---|---|---|---|---|
| SiO$_2$ (wt. %) | 10 | 10 | 10 | 10 | 10 |
| NiO (wt. %) | 4 | 0.5 | 4 | 4 | 0.5 |
| CoO (wt. %) | — | 3.5 | — | — | 3.5 |
| MoO$_3$ (wt. %) | 14 | 14 | — | 14 | 14 |
| WO$_3$ (wt. %) | — | — | 14 | — | — |
| Desulfurization Percentage (%) | 81 | 82 | 75 | 85 | 86 |
| Denitrogenation Percentage (%) | 29 | 30 | 26 | 32 | 33 |

EXAMPLES 20 THROUGH 26, COMPARATIVE EXAMPLES 7 THROUGH 10

The relationship between the amount of the hydrogenation-active metals supported and catalyst activity was investigated by varying the amount of the hydrogenation-active metals supported. The results are shown in Table 4. Table 4 shows that the effective amount of a Group VIII metal was 0.5 to 20 percent by weight and that of a Group VIB metal was 5 to 30 percent by weight.

EXAMPLE 27

Atmospheric gas oil fraction of Middle East Crude oil was used as a feed stock, and its hydrotreating was carried out by using catalyst Y or V under the following reaction conditions, with good results. Reaction conditions:

| | |
|---|---|
| Reaction Temperature (°C.) | 300 |
| Reaction Pressure (kg/cm$^2$ · G) | 10 |
| Liquid Hourly Space Velocity (V/H/V) | 0.8 |
| H$_2$/Feed (SCF/B) | 800 |

Feed oil properties:

| | |
|---|---|
| Specific Gravity 15/4° C. | 0.8437 |
| Sulfur Content (wt. %) | 1.07 |
| Nitrogen Content (ppm) | 58 |

BRIEF DESCRIPTION OF THE DRAWINGS

FIGS. 4 and 5 are graphs each illustrating the analytical results obtained by the temperature-programmed reduction method to observe the state of cobalt oxides supported on a catalyst prepared by allowing an alumina carrier to support cobalt by an ion exchange method.

FIG. 6 is a graph illustrating the analytical results obtained by the temperature-programmed reduction method to observe the state of cobalt oxides supported on a silica/alumina carrier subjected to the first step treatment by an impregnation method according to this invention.

Figure 1:
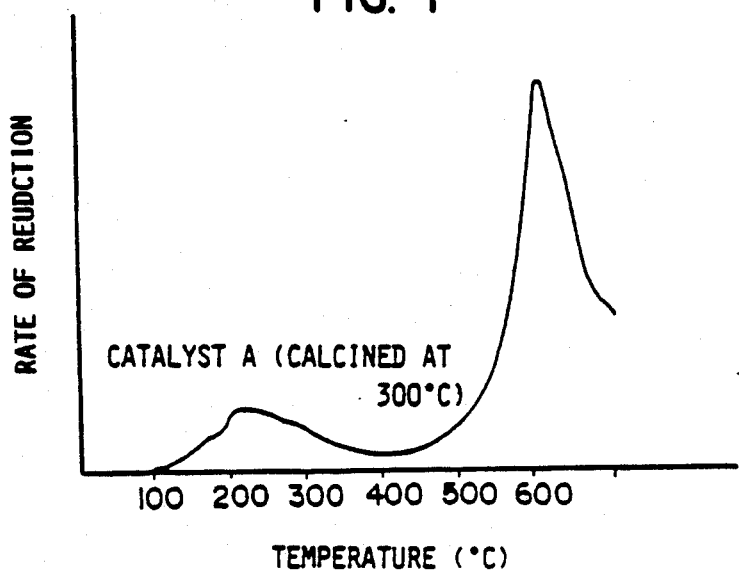
FIGS. 1 through 3 are graphs each illustrating the analytical results obtained by the temperature-programmed reduction method to observe the state of cobalt oxides supported by a silica/alumina carrier subjected to the first step treatment by an ion exchange method according to the process of this invention.
Figure 2:
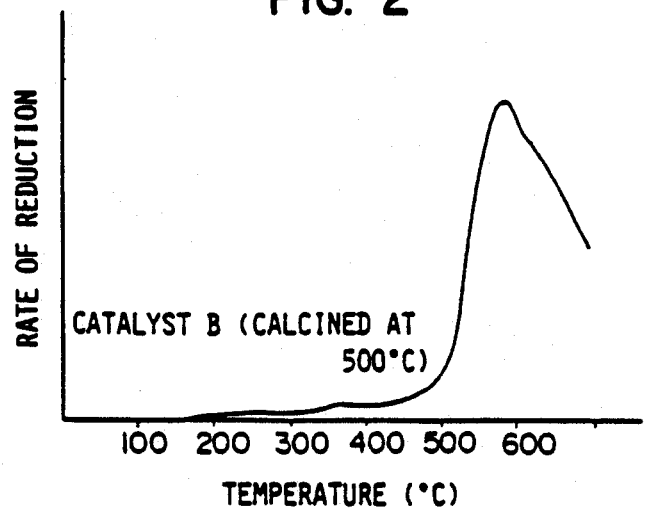
Figure 3:
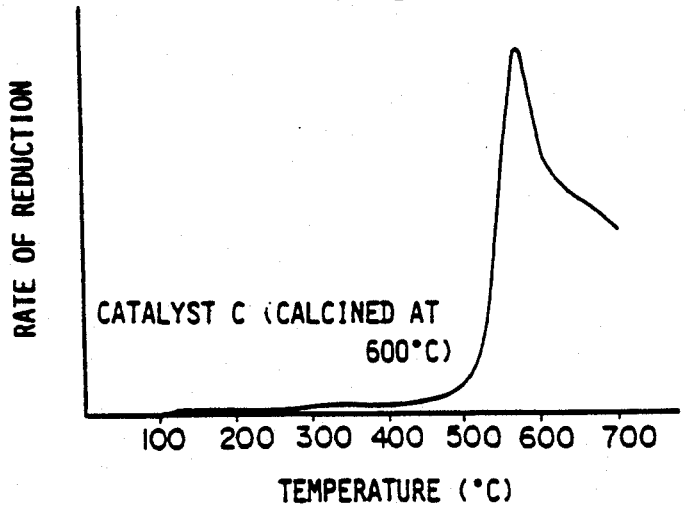
Figure 4:
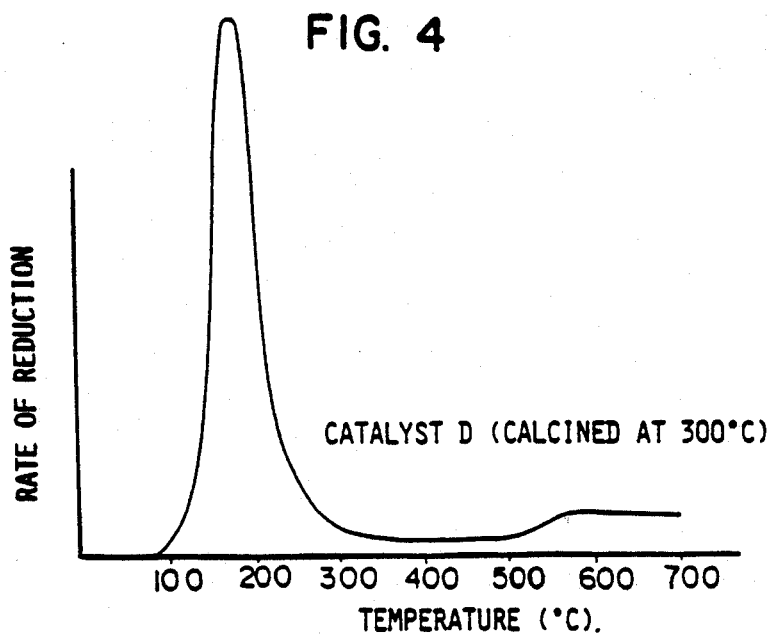

What is claimed is:

1. A process for producing a hydrotreating catalyst which comprises the following steps:
    (a) obtaining a carrier formed of silica/alumina or a silica/alumina-containing substance, said carrier comprising silica in an amount of 2 to 35 wt.%;
    (b) immersing said carrier initially in a solution of an amine complex salt of at least one Group VIII metal so as to obtain an impregnated carrier containing between about 0.5 to 20 wt. %, based on the oxide, of said Group VIII metal;
    (c) air drying and calcining said impregnated carrier of step (b);
    (d) immersing said air-dried and calcined carrier in a solution of a salt of at least one Group VIB metal so

TABLE 4

| | Compar. Ex. 7 | Ex. 20 | Ex. 21 | Ex. 22 | Ex. 23 | Compar. Ex. 8 | Compar. Ex. 9 | Ex. 24 | Ex. 25 | Ex. 26 | Compar. Ex. 10 |
|---|---|---|---|---|---|---|---|---|---|---|---|
| SiO$_2$ *(wt. %) | 10 | 10 | 10 | 10 | 10 | 10 | 10 | 10 | 10 | 10 | 10 |
| NiO (wt. %) | 0.2 | 1 | 5 | 8 | 12 | 25 | 5 | 5 | 5 | 5 | 5 |
| CoO (wt. %) | — | — | — | — | — | — | — | — | — | — | — |
| MoO$_3$ (wt. %) | 12 | 12 | 12 | 12 | 12 | 12 | 1 | 18 | 25 | 30 | 35 |
| Desulfurization Percentage (%) | 45 | 71 | 78 | 69 | 62 | 29 | 12 | 80 | 76 | 68 | 62 |
| Denitrogenation Percentage (%) | 10 | 23 | 28 | 21 | 16 | 7 | 4 | 32 | 29 | 24 | 16 |

*Weight percent, based on carrier.

as to obtain an impregnated carrier comprising between about 5 to 30 wt. %, based on the oxide, of said Group VIB metal.

2. A process according to claim 1 wherein the carrier which is first impregnated with said basic complex salt comprises between about 7 to 12 wt. % silica.

3. A process according to claim 1 wherein said silica-comprising carrier also comprises between about 1 to 10 wt. %, based on the silica/alumina, of a refractory inorganic oxide selected from the group consisting of magnesia, calcium oxide, zirconia, titania, boria, hafnia and a crystalline zeolite.

4. A process for producing hydrotreating catalyst which comprises:
(a) impregnating a carrier comprised of silica/alumina or a silica/alumina-containing composition, which carrier comprises from 2 to 35 wt. % silica, with at least one Group VIII metal, said Group VIII metal amine complex salt being contained on said carrier in an amount from about 0.5 to 20 wt. % in terms of its oxide;
(b) further impregnating the Group VIII metal-containing carrier of step (a) above with at least one Group VIB metal, said Group VIB metal being contained on said carrier in an amount from about 5 to 30 wt. % in terms of its oxide, wherein the carrier of both (a) and (b) above is characterized by the following pore distribution:
(i) the volume of pores having a diameter in the range of 30 to 100 Å is at least 70% of the volume of pores having a diameter in the range of 0 to 150 Å;
(ii) the volume of pores having a diameter in the range of 100 to 300 Å is less than about 30% of the volume of pores having a diameter in the range of 0 to 300 Å (the pore volume in (i) and (ii) being determined by the nitrogen adsorption method);
(iii) the volume of pores having a diameter in the range of 150 to 150,000 Å as measured by the mercury porosimetry method is about 0.005 to 0.25 ml/g;
(iv) the volume of pores having a diameter in the range of 300 to 15,000 Å as measured by the mercury porosimetry method is less than 0.05 ml/g;
(v) the volume of pores having a diameter in the range of 150 to 2000 Å as measured by the mercury porosimetry method is less than about 0.01 ml/g; and
(vi) the volume of pores having a diameter in the range of 0 to 600 Å as measured by the nitrogen adsorption method is in the range of about 0.30 to 0.70 ml/g.

5. A process according to any one of claims 1, 2, 3 and 4 wherein said Group VIII metal is selected from the group consisting of cobalt, nickel and mixtures thereof and said Group VIB metal is selected from the group consisting of molybdenum, tungsten and mixtures thereof.

6. A hydrotreating catalyst whenever produced by the process of any one of claims 1, 2, 3 and 4 comprising a hydrogenation-active component comprised of at least one metal selected from the Group VIII metals and at least one metal selected from the Group VIB metals supported on an alumina or alumina-containing carrier comprising from about 2 to 35 weight % silica, said catalyst being further characterized by having a specific surface area in the range from about 200 to 400 $m^2/g$, a total pore volume of about 0.4 to 0.9 ml/g, a bulk density of about 0.5 to 1.0 g/ml, and the following pore distribution:
(1) the volume of pores having a diameter in the range of 30 to 100 Å is at least 70% of the volume of pores having a diameter in the range of 0 to 150 Å;
(2) the volume of pores having a diameter in the range of 100 to 300 Å is less than about 30% of the volume of pores having a diameter in the range of 0 to 300 Å (the pore volume in (1) and (2) being determined by the nitrogen adsorption method);
(3) the volume of pores having a diameter in the range of 150 to 150,000 Å as measured by the mercury porosimetry method is about 0.005 to 0.25 ml/g;
(4) the volume of pores having a diameter in the range of 300 to 15,000 Å as measured by the mercury porosimetry method is less than 0.05 ml/g;
(5) the volume of pores having a diameter in the range of 150 to 2000 Å as measured by the mercury porosimetry method is less than about 0.01 ml/g; and
(6) the volume of pores having a diameter in the range of 0 to 600 Å as measured by the nitrogen adsorption method is in the range of about 0.30 to 0.70 ml/g.

7. A hydrotreating catalyst whenever produced by the process of any one of claims 1, 2, 3 and 4 and comprising a hydrogenation-active component comprised of at least one Group VIII metal selected from the group consisting of cobalt, nickel and mixtures thereof and at least one metal selected from the group consisting of molybdenum, tungsten and mixtures thereof supported on an alumina or alumina-containing carrier comprising between about 7 to 12 wt. % silica, said Group VIII metal being present in an amount of between about 0.5 to 20 wt. % (based on the oxide) and said Group VIB metal being present in an amount between about 5 to 30 wt. % (based on the oxide), said catalyst being further characterized in having a specific surface area in the range from about 200 to 400 $m^2/g$, a total pore volume of about 0.4 to 0.9 ml/g, a bulk density of about 0.5 to 1.0 g/ml and the following pore distribution:
(1) the volume of pores having a diameter in the range of 30 to 100 Å is at least 90% of those having a diameter of 0 to 150 Å;
(2) the volume of pores having a diameter in the range of 100 to 300 Å is less than about 20% the volume of pores having a diameter in the range of 0 to 300 Å;
(3) the volume of pores having a diameter in the range of 150 to 150,000 Å as measured by the mercury porosimetry method is 0.02 to 0.10 ml/g;
(4) the volume of pores having a diameter in the range of 300 to 15,000 Å as measured by the mercury porosimetry method is less than 0.02 ml/g;
(5) the volume of pores having a diameter in the range of 150 to 2000 Å as measured by the mercury porosimetry method is less than about 0.01 ml/g; and
(6) the volume of pores having a diameter in the range of 0 to 600 Å as measured by the nitrogen adsorption method is in the range of about 0.45 to 0.60 ml/g.

* * * * *